United States Patent [19]

Harr

[11] Patent Number: 5,475,570
[45] Date of Patent: Dec. 12, 1995

[54] FUSE MOUNTING BRACKET FOR LIVE FRONT PADMOUNTED SWITCHGEAR

[75] Inventor: Deborah L. Harr, Columbia, Mo.

[73] Assignee: Hubbell Incorporated, Orange, Conn.

[21] Appl. No.: 312,562

[22] Filed: Sep. 26, 1994

[51] Int. Cl.$^6$ ...................................................... H02B 9/00
[52] U.S. Cl. ........................ 361/825; 337/174; 361/626; 439/366; 439/621
[58] Field of Search ........................ 312/223.1; 361/605, 361/610, 626, 646, 807, 809–811, 825, 829, 832, 833, 834, 837, 835; 439/13, 250, 366, 621, 622; 337/168–174, 169, 178, 180, 186, 190, 208–211; 200/51 R; 248/291

[56] References Cited

U.S. PATENT DOCUMENTS

| | | |
|---|---|---|
| D. 254,614 | 4/1980 | Biller et al. . |
| D. 254,615 | 4/1980 | Evans et al. . |
| 4,268,811 | 5/1981 | Evans et al. . |
| 5,062,022 | 10/1991 | Beard ...................................... 361/335 |
| 5,181,158 | 1/1993 | Goe, Jr. ................................... 361/335 |
| 5,254,814 | 10/1993 | Harr ....................................... 200/17 R |

OTHER PUBLICATIONS

S&C Manual PMH and PMS Pad–Mounted Gear, Outdoor Distribution (14.4 kv and 25 kv), Descriptive Bulletin 662–30, Apr. 30, 1984.

Primary Examiner—Gerald P. Tolin
Attorney, Agent, or Firm—Jerry M. Presson; Warren N. Williams

[57] ABSTRACT

A fuse mounting bracket assembly for air-insulated, live front padmounted switchgear is provided that in a first configuration permits only one type of fuse to be selectively mounted in the bracket assembly and in a second configuration allows only a second different type of fuse to be selectively mounted in the bracket assembly. The bracket assembly includes a main frame having an end wall and two side walls with slots being provided in the side walls for pivotally receiving opposed, outwardly extending mounting protuberances on the selected one type of fuse. A pair of adapters may be selectively mounted on the frame assembly in blocking relationship to the slots and which present components that extend inwardly toward one another from respective side walls for engagement with a mounting hook on a second type of fuse, thus allowing the fuse mounting bracket assembly to be selectively configured for either of the two types of fuses with minimum overall parts requirements.

7 Claims, 4 Drawing Sheets

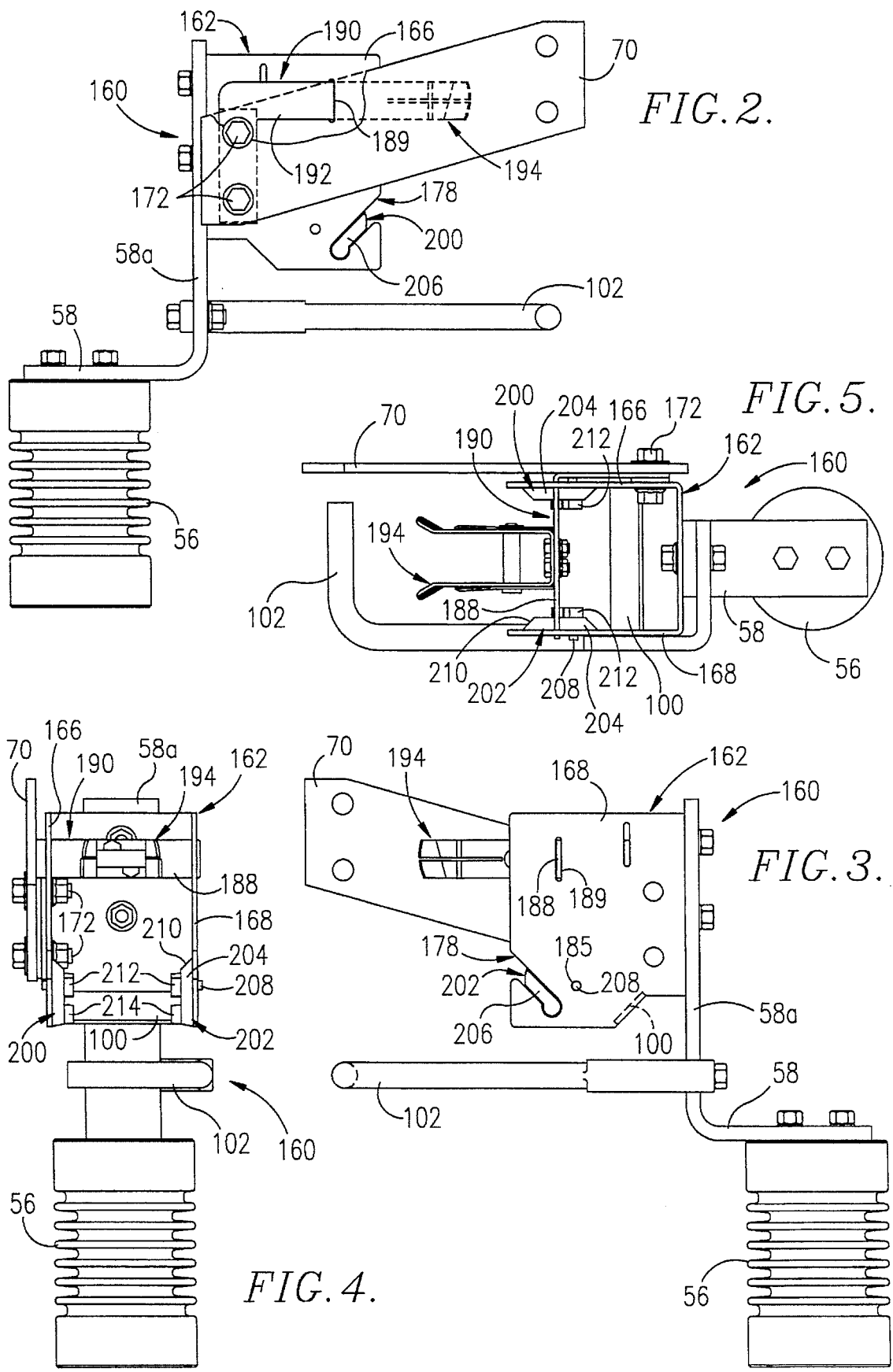

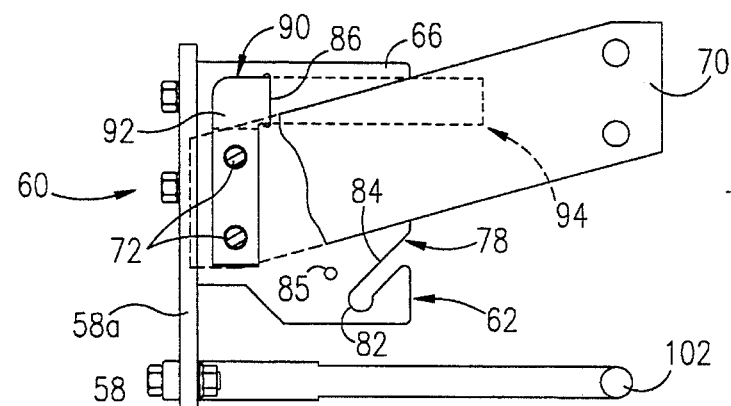
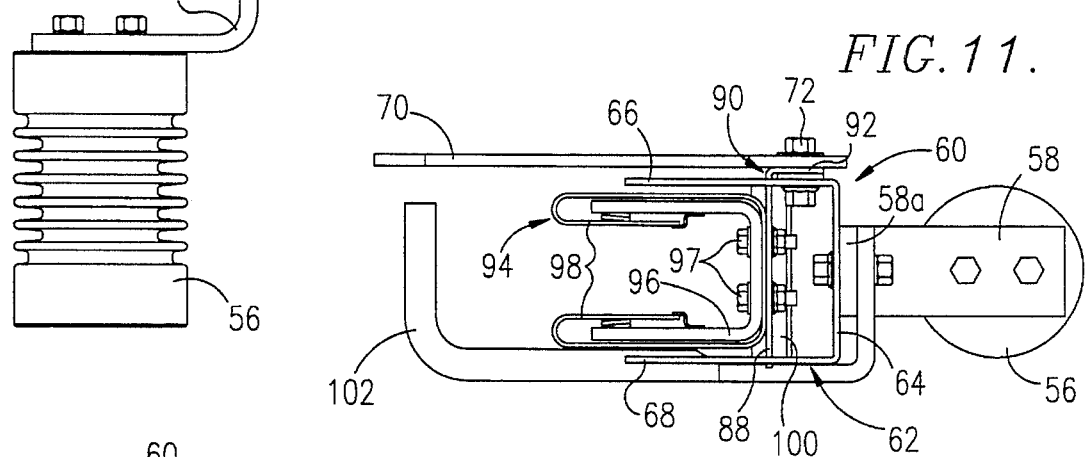
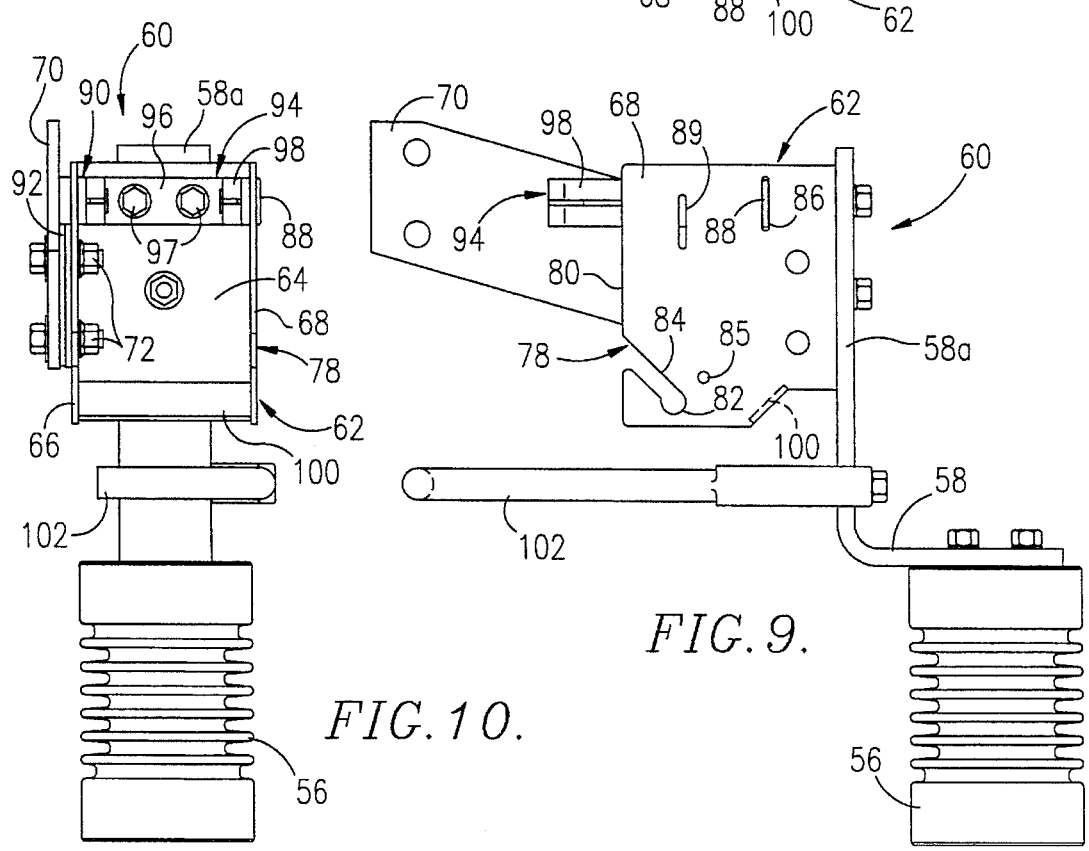

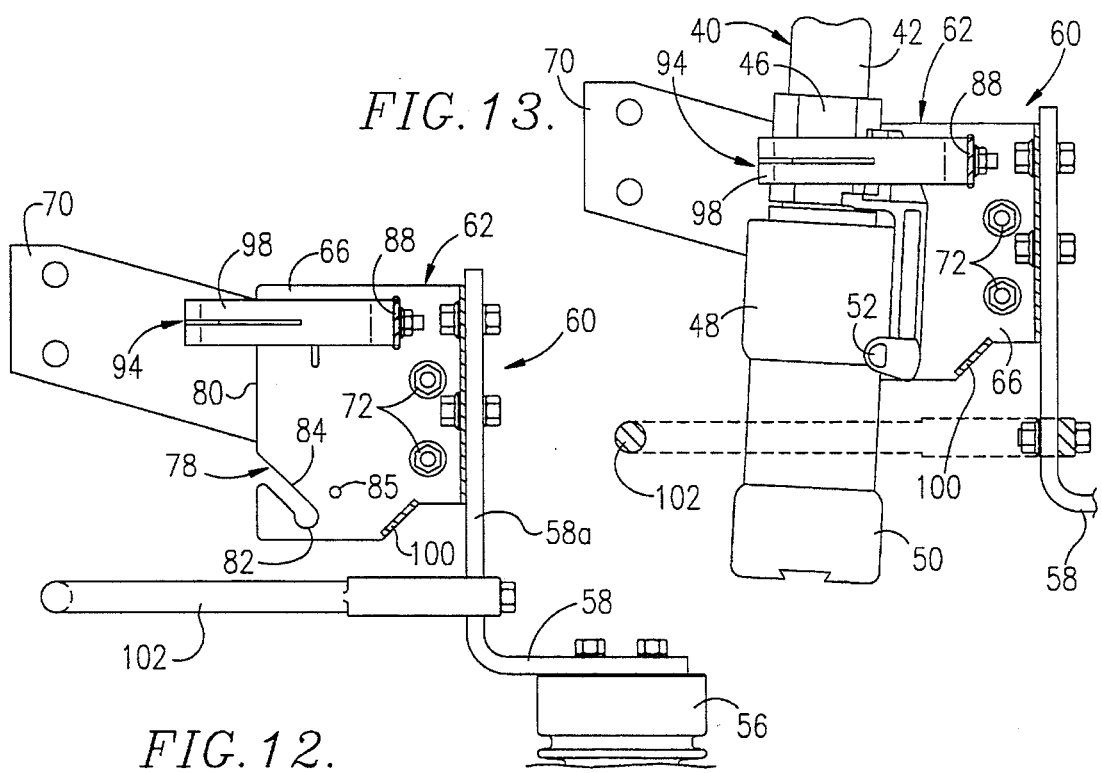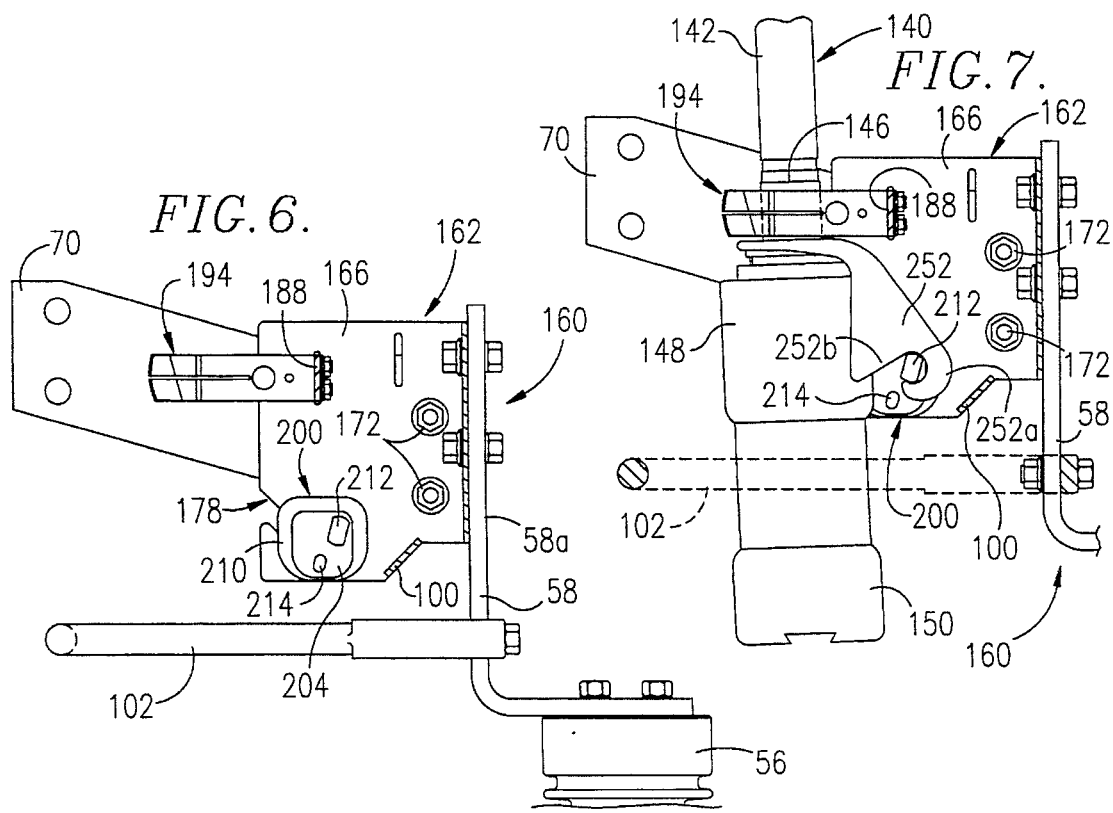

FUSE MOUNTING BRACKET FOR LIVE FRONT PADMOUNTED SWITCHGEAR

BACKGROUND OF THE INVENTION

1. Field of the Invention

This invention relates to live front padmounted electrical switchgear, and especially to a fuse mounting bracket assembly which may readily be adapted to pivotally receive one or the other but not both of two distinctly different types of fuses.

2. Description of the Prior Art

Padmounted electrical switchgear for use in electrical distribution systems and particularly underground systems, may be of the air-insulated, live front type in order to provide desirable in-air visibility, in-air switching and in-air installation. Switchgear of this type normally includes fuses to protect the distribution system from fault currents while providing coordination with upstream and downstream protective devices.

Power fuses of the type having fusible conductive elements of silver or nickel-chrome are frequently used to provide necessary circuit protection. These circuit interrupting fuses typically include an elongated tubular insulating body provided with an upper contact surface and a lower contact surface adapted to be engaged with upper and lower switch terminals respectively. The internal fusible element which is designed to melt under a predetermined fault condition is connected to the upper and lower contacts respectively of the fuse. The fuses are pivotally mounted on the lower terminal such that they may be pivoted to an open circuit interrupting position when it is desired to provide for positive interruption of the circuit for maintenance purposes or the like, or instances where it is necessary to replace a blown fuse.

In one widely used, conventional type of power fuse, the lower contact has a pair of aligned, oppositely directed pins adapted to be pivotally received within a mounting bracket carried by a support within the housing of the switchgear. One fuse of this type is available from S & C Electric Company, Chicago, Ill. as Model SML-4Z power fuse. A support bracket for the SML-4Z type fuse is illustrated in Design U.S. Pat. No. 254,614.

In a second type of power fuse, a mounting hook is provided on the lower contact of the fuse for engagement with hook receiving means on a supporting bracket within the switchgear housing. A fuse of this type is available from S & C Electric Company as Model SML-20 power fuse. A support bracket for the SML-20 type fuse is shown in Design U.S. Pat. No. 254,615.

It has been the practice in the past to provide two separate, totally independent brackets for pivotally mounting respective types of power fuses. This required fabrication and stocking of power fuse support brackets for each type of power fuses.

SUMMARY OF THE INVENTION

In accordance with the present invention, a power fuse support bracket assembly is provided that may be simply and readily adapted for supporting either a power fuse having oppositely directed support pivot pins on the lower contact of the fuse, or a power fuse of the type provided with a transversely extending mounting hook on the lower contact. When configured for receiving a power fuse having pivot pins on the lower contact, the bracket assembly will not accommodate the second type of power fuse having a mounting hook at the lower contact end of the fuse body. In like manner, when configured for receiving a power fuse provided with a mounting hook at the lower contact end of the fuse body, the support bracket assembly will not receive a power fuse having support pins on the lower contact.

In order to minimize parts requirements for a bracket assembly which will accommodate one or the other of the standard types of power fuses, but not both, the assembly includes a U-shaped main frame having a rear wall and two side walls which make up a part of the common bracket assembly for both types of fuses. The side walls of the main frame are provided with inclined slots located to receive respective pivot pins of one type of fuse. Where the bracket assembly is to be used for supporting the second type of power fuse having a mounting hook on the lower contact, a pair of adapters may be selectively mounted on the side walls in blocking relationship to the slots, and presenting inwardly extending components strategically positioned to engage the mounting hook of the second type of power fuse. Thus, the adapters serve the dual function of blocking the slots so that it is not possible to mount a power fuse in the bracket assembly of the type having a pair of opposed mounting pins, while at the same time allowing use of the same main frame for both power fuse applications.

The main frame of the bracket assembly also is provided with means allowing lower terminal contacts to be mounted on the main frame in one of two alternate dispositions depending upon whether the bracket assembly is configured to mount a pivot pin type of power fuse, or a mounting hook type of power fuse.

BRIEF DESCRIPTION OF THE DRAWINGS

FIG. 2 is a fragmentary enlarged side elevational view of the fuse mounting bracket assembly in the configuration thereof illustrated in FIG. 1 but showing the opposite side of the bracket assembly, and with parts being broken away for clarity;

FIG. 3 is a fragmentary enlarged view of the fuse mounting bracket assembly as shown in FIG. 2 and illustrating the opposite side of the bracket assembly;

FIG. 4 is a fragmentary enlarged front elevational view of the fuse mounting bracket assembly as depicted in FIGS. 2 and 3;

FIG. 5 is a fragmentary enlarged top view of the fuse mounting bracket assembly as shown in FIGS. 2, 3 and 4;

FIG. 6 is a fragmentary enlarged vertical cross sectional view of the fuse mounting bracket assembly as shown in FIG. 1 of the drawings;

FIG. 7 is a fragmentary enlarged vertical cross sectional view of the fuse mounting bracket assembly as shown in FIG. 6, but also fragmentarily showing the lower end of a mounting hook type power fuse in normal operative position in the bracket assembly;

FIG. 8 is a fragmentary enlarged side elevational view of the fuse mounting bracket assembly in the configuration thereof illustrated in FIG. 1A but showing the opposite side of the bracket assembly, and with parts being broken away for clarity;

FIG. 9 is a fragmentary enlarged view of the fuse mounting bracket assembly as shown in FIG. 8 and illustrating the opposite side of the bracket assembly;

FIG. 10 is a fragmentary enlarged front elevational view of the fuse mounting bracket assembly as depicted in FIGS. 8 and 9;

FIG. 11 is a fragmentary enlarged top view of the fuse mounting bracket assembly as shown in FIGS. 8, 9 and 10;

FIG. 12 is a fragmentary enlarged vertical cross sectional view of the fuse mounting bracket assembly as shown in FIG. 1 of the drawings; and FIG. 13 is a fragmentary enlarged vertical cross sectional view of the fuse mounting bracket assembly as shown in FIG. 12, but also fragmentarily showing the lower end of a pivot mounting pin type power fuse in normal operative position in the bracket assembly.

DETAILED DESCRIPTION OF THE PREFERRED EMBODIMENTS

Figure 1:
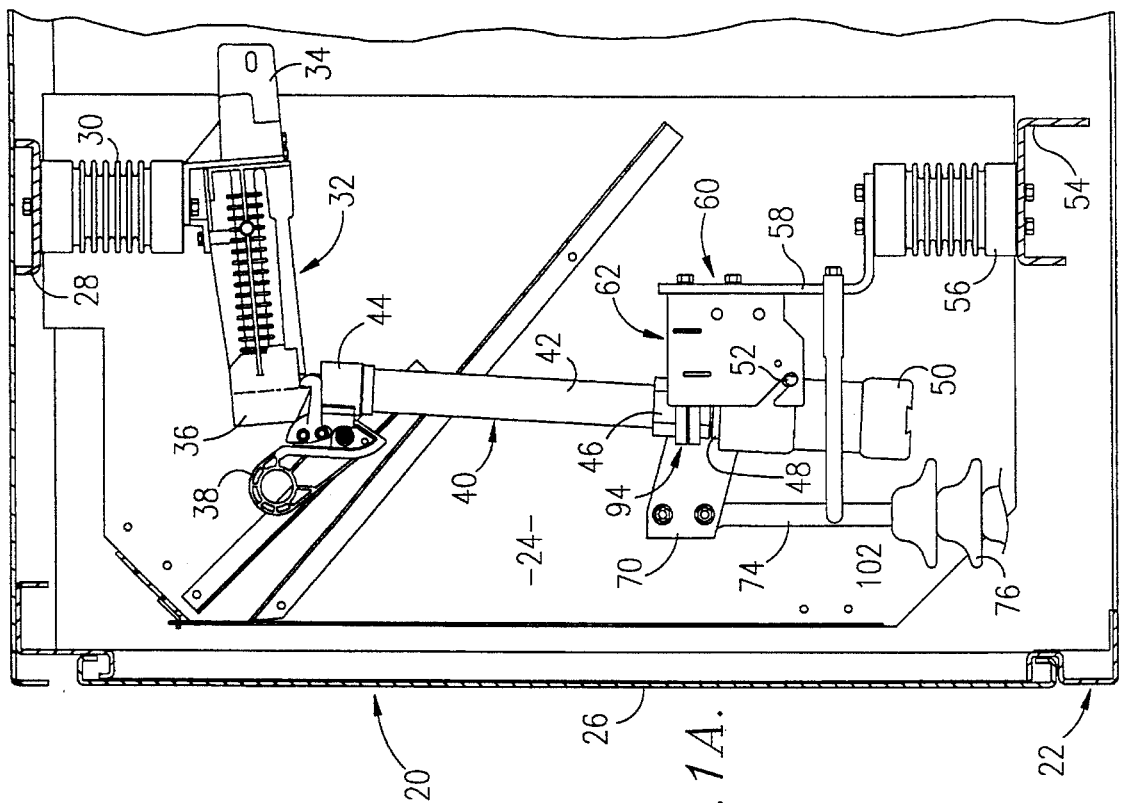
FIG. 1 is a fragmentary cross sectional view of live front padmounted switchgear provided with load break structure and an associated power fuse, and illustrating the fuse mounting bracket assembly of the present invention in the configuration thereof for receiving a power fuse of the type having a mounting hook on the lower contact thereof.
Figure 1A:
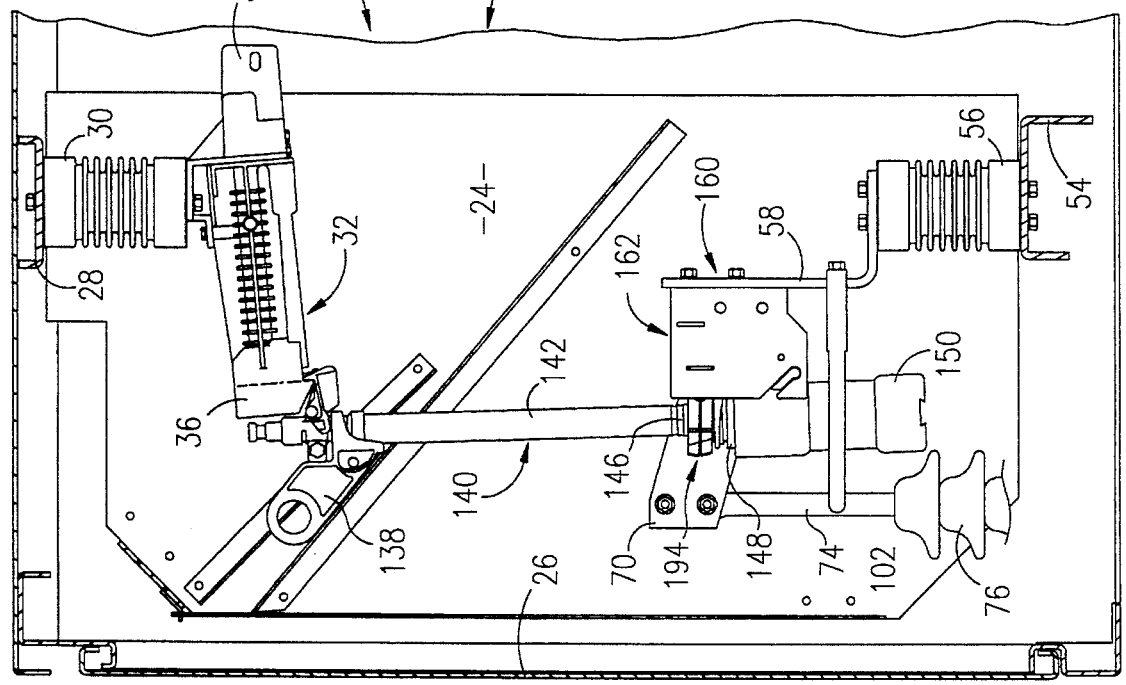
FIG. 1A is a fragmentary cross sectional view of live front padmounted switchgear of the type illustrated in FIG. 1, but showing the fuse mounting bracket assembly in the configuration thereof for receiving a power fuse of the type having a pair of pivot support pins on the lower contact.

The live front padmounted switchgear unit broadly designated 20 in FIG. 1A typically includes a housing defined by cabinet 22 and having a switch side compartment (not shown), along with a fuse side compartment 24. Access to compartment 24 is gained through door 26. Units 20 usually are adapted for three-phase circuit operation, and in many instances have side-by-side compartments 24, each of which may accommodate separate three-phase service.

A cross member 28 in the upper part of compartment 24 mounts a series of depending insulator supports 30, one for each electrical phase. A load interrupting device 32 secured to and carried by each of the insulators 30 is provided with a terminal 34 for connection to one phase of an electrical circuit. An electrical terminal (not shown) is provided on the end of interrupting device 32 opposite terminal 34 is adapted to releasably receive the upper contact of a contact and latch assembly 38 of a power fuse 40. The electrical terminal for contact and latch assembly 38 of a power fuse 40 is housed within the cover structure 36 of interrupting device 32. Contact and latch assembly 38 of power fuse 40 may, for example, be constructed generally in a manner as illustrated and described in U.S. Pat. No. 4,268,811, which is incorporated herein by reference thereto.

The central tubular body 42 of power fuse 40 is of insulating material and typically houses a metallic fusible element of silver, nickel-chrome, or equivalent material. The uppermost end of tube 42 is telescoped into the metallic end ferrule 44 of contact and latch assembly 38 as best shown in FIG. 1A. The lower end of fuse tube 42 is received within metal contact ferrule 46 located above a fuse support body 48 which in turn may mount an exhaust control device 50. Body 48 has a pair of opposed, integral outwardly extending, transversely oriented mounting pivot pins 52.

A cross member 54 within cabinet 22 at the lower end of compartment 24 directly below cross member 28 mounts a series of upstanding insulator supports 56 with one support 56 being provided for each support 30. An L-shaped support member 58 carried by the upper end of a respective insulator 56 carries the fuse mounting bracket assembly 60 of this invention.

Referring to FIGS. 8–13, assembly 60 includes a U-shaped main frame 62 made up of a normally upright generally rectangular end wall 64 and two essentially rectangular, upright side walls 66 and 68 respectively. It can be observed from FIGS. 8–13 that the end wall 64 of main frame 62 is bolted to the upright leg 58a of L-shaped support member 58. A polygonal conductive plate 70 is connected to side wall 66 of main frame 62 by a pair of bolt means 72. Plate 70 is adapted to be connected electrically to a conductor 74 (FIG. 1A) associated with a series of insulators 76. Conductor 74 comprises a continuation of the circuit phase connected to terminal 34.

The side walls 66 and 68 of main frame 62 are each provided with an elongated inclined slot 78 therein. Each slot 78 extends inwardly from the outer marginal upright edge 80 of a corresponding side wall 66 and 68, and terminates in a semi-circular arcuate inner portion 82 of greater diameter than the transverse extent of the elongated section 84 of a respective slot 78. It is to be noted from FIG. 9 that the slots 78 of side walls 66 and 68 are horizontally aligned, and of the same length, shape and size. The slots 78 are configured to receive pins 52 of fuse support body 48 which come to rest in and are pivotal within arcuate sections 82 thereof. It can be seen from FIG. 9 that each of the slots 78, which are at an angle of about 45°, are located in the lower left-hand quadrants of side walls 66 and 68 when viewed from the perspective of FIG. 9 of the drawings. Horizontally aligned openings 85 are also provided in side walls 66 and 68 adjacent slots 78. These openings are not used when fuse mounting bracket assembly 60 is employed for supporting power fuses of the type designated 40, but are employed for mounting of a second type of power fuse as explained hereinafter.

The side walls 66 and 68 are also provided with upright, relatively narrow, horizontally aligned openings 86 adjacent the upper edge of each for selective receipt of the main segment 88 of an L-shaped cross member 90 which has a short mounting segment 92 located outboard of side wall 66 which is secured to side wall 66 by the upper bolt means 72. The main segment 88 of cross member 90 serves to mount lower contact unit 94. As is apparent from FIGS. 10 and 11, contact unit 94 includes a U-shaped support 96 which is bolted to main segment 88 of cross member 90 by bolts 97. Contact unit 94 has spring biased contacts 98 which are carried by main segment 88 of cross member 90 and backed up by support 96. It can be observed from FIGS. 1A and 13 that the contacts 98 embrace and electrically engage contact ferrule 46 of power fuse 40. Additional horizontally aligned openings 89 are provided in side walls 66 and 68 in closer proximity to edges 80 than openings 86, for mounting of cross member 90 in a different position than that illustrated in FIGS. 8–13, to permit location of the lower contact unit in a different position when the fuse mounting bracket assembly is used to receive a second type of power fuse.

As is most evident from FIGS. 3–5, a flat strip 100 interconnects sidewalls 66 and 68 and serves to stabilize the legs of the U-shaped bracket to prevent sidewalls 66 and 68 from spreading. A U-shaped grounding bar 102 may be secured to support 58 below main frame 62 as is illustrated in FIGS. 1A and 8–13.

When a fuse 40 is actuated by a fault current thus resulting in melting of the fusible element therein, the circuit through the respective fuse is interrupted and remains in that condition until the fuse is replaced. Upon manual opening of power fuse 40 to interrupt the circuit, or to permit refusing, the latch of assembly 38 is released as an outward pull is exerted on assembly 38 thus allowing the fuse 40 to pivot about the axes of pins 52 as the fuse body swings in a counterclockwise direction viewing FIG. 1A. Exhaust control device 50 engages the corner of support 58 to limit swinging movement of fuse 40. In this position, the fuse 40 can then be replaced with a new fuse by simply pulling the actuated fuse outwardly from the bracket assembly 60.

FIG. 1 is also an illustration of switchgear unit 20 having the same components as the unit of FIG. 1A except for the power fuse, which is designated by the numeral 140, and the fuse mounting bracket assembly which is identified by the numeral 160. Power fuse 140 as shown in FIG. 1 has an upper contact and latch assembly 138 which is specifically different in constructional details from assembly 38, but is essentially equivalent in function and operation. It therefore also has an insulating tube 142, a lower metal contact ferrule 146, a fuse support body 148 and may have an exhaust control device 50 mounted on the lower end of body 148.

Fuse support body 148 has mounting hooks 252 thereon in lieu of the pivot pins 52 of power fuse 40. Viewing FIG. 7, it can be seen that the hooks 252 are located below contact ferrule 146 of power fuse 140, and have portions 252a which are located to one side of body 148.

As is evident from FIGS. 2-7, bracket assembly 160 has a U-shaped main frame 162 which is identical in construction to bracket assembly 60, and thus also has a connector strip 100 joining the sidewalls 166 and 168 of U-shaped bracket 162. Bracket assembly 160 is thus mounted in the same manner and in the same position on support member 58, as the location and mounting of bracket assembly 60 illustrated in FIG. 1A.

One difference between bracket assembly 160 and bracket assembly 60 is the provision of a pair of generally rectangular adapters 200 and 202 (FIGS. 4 and 6) mounted on the inner faces of side walls 166 and 168 of the main frame 162. The adapters 200 and 202 are mirror images of one another.

Thus, each adaptor 200 and 202 includes a main generally slab-sided body 204 provided with an integral, elongated extension 206 projecting outwardly from the normally outermost face of each adaptor. The extensions 206 are configured to be complementally received in a respective slot 178, as depicted in FIGS. 2 and 3. Circular connectors 208 also project from the same face of each adaptor body 204 as extensions 206, are spaced from the latter, and are adapted to be complementally received in respective openings 185 in side walls 166 and 168. Connectors 208 are desirably fixed to respective walls 166 and 168 by peening of the outer end of each connector after it has been inserted in a respective opening 185. Joinder means other than peening may be used with equal facility to secure connectors 208 to walls 166 and 168.

The peripheral margins 210 of adapters 200 and 202 are preferably chamfered as illustrated in FIG. 4. The faces of respective adapters 200 and 202 opposite extensions 206 are each provided with a component 212 which projects outwardly from such face into the space between side walls 166 and 168 of U-shaped main frame 162. As is best shown in FIGS. 6 and 7, the components 212 are somewhat elongated in shape and located in an upper quadrant of a respective adaptor. The components 212 are strategically positioned to engage the hook portions 252a of hooks 252 on power fuses 140 when the latter are supported in operative position on the fuse mounting bracket assembly 160. A strip 100 also spans the distance between upright bracket sidewalls 166 and 168, in essentially the same position as the strip 100 between bracket sidewalls 66 and 68.

Each of the adapters 200 and 202 has a stop 214 projecting outwardly from the same face as components 212 thereon and located to be engaged by the projecting portion 252b of each hook 252, after the fuse 140 has pivoted to a predetermined extent upon release of contact and latch assembly 138 from an associated interrupting device 32.

In order to accommodate a different position of the contact ferrule 146 of fuse 140 as compared with the location of contact ferrule 46 of fuse 40, the contact unit 194 of bracket assembly 160 is mounted at a somewhat lower position than the contact unit 94 of bracket assembly 60, and is also positioned forwardly in the main frame 162 as compared with the position such as contact unit 94 in bracket assembly 60.

As is evident from FIGS. 2-5, a cross member 190 is located such that the main segment 188 thereof extends through aligned openings 189 in side walls 166 and 168 of main frame 162. The mounting segment 192 of cross member 190 is secured to side wall 166 by a pair of bolts 172. The contact unit 194 is bolted to main segment 188 of cross member 90 in disposition to engage the contact ferrule 146 of fuse 140, as best shown in FIGS. 2, 4, 5 and 13.

Upon operation of fuse 140 by a fault current, the fusible element therein again melts to immediately interrupt the current flow. The circuit remains open until the power fuse is replaced.

Thus, when switchgear unit 20 is adapted to receive a power fuse such as fuse 40, the fuse mounting bracket assembly 60 is not provided with adapters 200 and 202. The pivot pins 52 are disposed in slots 178 of side walls 166 and 168, and the fuse 40 rotated to a position as shown in FIG. 1A to cause the latch of assembly 38 to engage load interrupting device 32.

However, when switchgear unit 20 is configured to receive a power fuse of the type designated 140 in FIG. 1, fuse mounting bracket assembly 60 in that instance is provided with the adapters 200 and 202. As shown in FIG. 7, the hook 252 may be positioned with the portion 252a thereof engaging opposed extensions 212 and the fuse body thereafter rotated to bring the latch of assembly 138 into engagement with load interrupter 32 as shown in FIG. 1.

If the lineman desires to manually open the circuit containing 140, or a blown fuse requires refusing, actuation of the latch assembly 138 allows power fuse 140 to swing counterclockwise as depicted in FIG. 1 until portion 252b of hooks 252 on body 148 of fuse 140 engages stop 214 on respective adapters 200 and 202. The actuated fuse 140 may be removed from assembly 160 by simply lifting up on the fuse body 140 to cause the portions 252a of hooks 252 to clear extensions 212 of adapters 200 and 202.

It can be seen from the foregoing that when switchgear unit 20 is set up to receive a power fuse of the type designated by the numeral 140 in FIG. 1, it is not possible to mistakenly mount a fuse of the type 40 shown in FIG. 1A upon bracket assembly 160, because of the intervention of extensions 206 which substantially fill and block slots 178 of side walls 166 and 168 of main frame 162. Similarly, a fuse of the type 140 cannot be placed in the bracket assembly 60 because of the absence of structure for engaging hook 252.

Consequently, it is not possible to place the wrong fuse in the fuse body. Furthermore, the fact that bracket assembly 60, and bracket assembly 160 are identical, except for the provision of adapters 200 and 202 where the assembly is to receive a power fuse of the type 140, simplifies the parts necessary to fabricate the fuse bracket assembly structure, thus lowering the overall costs of the brackets, not only from a minimum parts standpoint, but also by decreasing required parts inventory.

I claim:

1. A fuse mounting bracket assembly for live front pad-mounted switchgear which may pivotally receive a fuse of one type having a pair of opposed, outwardly extending mounting protuberances on the lower pivot end thereof, or a fuse of a second type having a transversely extending mounting hook on the lower pivot end, said bracket assembly comprising:

a U-shaped main frame provided with a normally upright end wall and opposed, generally parallel upright side walls joined to the upright margins of the end wall, said side walls each having an outer upright edge spaced from the end wall, and opposed upper and lower edges joining a corresponding outer edge with the end wall, each of said side walls being provided with an elongated slot therein extending from a respective outer upright edge toward a corresponding lower edge of the side wall, said slots being in general alignment with respect to one another, said slots being configured and arranged to complementally receive respective protuberances of said one type of fuse for pivotal mounting of the latter in said frame;

U-shaped contact means carried by the main frame above the slots in said side walls, opening in the same direction as the main frame and adapted to engage a lower contact of a fuse mounted in the main frame; and adaptor means removably mounted on said frame for pivotal mounting of said second type of fuse on the main frame, said adaptor means including extensions removably received in said slots of said side walls, connector means for joining the adaptor means to respective side walls of the main frame, and means extending away from the inner face of each of the side walls toward an opposite side wall for engaging the mounting hook on the lower pivot end of said second type of fuse when the latter is pivotally mounted in the main frame.

2. A fuse mounting bracket assembly for live front pad-mounted switchgear as set forth in claim 1, wherein each of said slots has an elongated section extending away from said edge of a respective side wall, and an enlarged, generally arcuate innermost portion of greater diameter than the width of a corresponding section of the slot.

3. A fuse mounting bracket assembly for live front pad-mounted switchgear as set forth in claim 1, wherein said adaptor means includes a pair of adapters removably mounted on said frame, each of said adapters having a main body, an extension received in a corresponding slot of a respective side wall, connector means thereon for joining each adaptor to its associated side wall, and a component projecting inwardly toward an opposed side wall for engaging the mounting hook of said second type of fuse.

4. A fuse mounting bracket assembly for live front pad-mounted switchgear as set forth in claim 1, wherein is provided means for selectively mounting said contact means on at least one of the side walls in one position of the contact means when the frame is used to mount said one type of fuse, and for selectively mounting said contact means on at least one of the side walls in a second position of the contact means when the frame is used to mount second type of fuse.

5. A fuse mounting bracket assembly for live front pad-mounted switchgear as set forth in claim 1, wherein said adapter means is provided with stop means thereon located to be engaged by a fuse pivotally mounted in said main frame means after the fuse has pivoted to a predetermined extent relative to the main frame.

6. A fuse mounting bracket assembly for live front pad-mounted switchgear as set forth in claim 3, wherein pin stops are on each of the adapters, extending toward an opposed side wall of the frame, and located to be engaged by a fuse pivotally mounted in said frame means after the fuse has pivoted to a predetermined extent relative to the main frame.

7. A fuse mounting bracket assembly for live front pad-mounted switchgear as set forth in claim 1, wherein said said contact means is mounted on at least one of the side walls of the main frame by a cross member spanning the side walls, means mounting the contact means on said cross member, and a pair of openings in at least said one side wall, one of the openings receiving said cross member when the contact means is located in said one position thereof, and the other opening receiving said cross member when the contact means is located in said second position thereof.

* * * * *